(12) United States Patent
Martoff

(10) Patent No.: US 7,157,719 B2
(45) Date of Patent: Jan. 2, 2007

(54) NEUTRON SOURCE DETECTION CAMERA

(75) Inventor: Charles Jeffrey Martoff, Swarthmore, PA (US)

(73) Assignee: Temple University of the Commonwealth System of Higher Education, Philadelphia, PA (US)

( * ) Notice: Subject to any disclaimer, the term of this patent is extended or adjusted under 35 U.S.C. 154(b) by 0 days.

(21) Appl. No.: 11/344,704

(22) Filed: Feb. 1, 2006

(65) Prior Publication Data

US 2006/0261283 A1  Nov. 23, 2006

Related U.S. Application Data

(62) Division of application No. 10/899,411, filed on Jul. 26, 2004, now Pat. No. 7,049,603.

(51) Int. Cl.
*G01N 23/05* (2006.01)
(52) U.S. Cl. ................................. 250/390.02
(58) Field of Classification Search ............ 250/390.02
See application file for complete search history.

(56) References Cited

U.S. PATENT DOCUMENTS

| | | | |
|---|---|---|---|
| 3,898,465 A | 8/1975 | Zaklad et al. | |
| 4,286,158 A | 8/1981 | Charpak et al. | |
| 4,595,834 A | 6/1986 | Burns | |
| 4,931,653 A | 6/1990 | Hamm et al. | |
| 5,223,717 A | 6/1993 | Charpak | |
| 5,278,418 A | 1/1994 | Broadhurst | |
| 5,838,759 A | 11/1998 | Armistead | |
| 6,011,265 A | 1/2000 | Sauli | |
| 6,198,798 B1 | 3/2001 | Sauli | |
| 6,362,484 B1 | 3/2002 | Beyne et al. | |
| 6,770,884 B1 * | 8/2004 | Bryman ............. | 250/366 |
| 2002/0139935 A1 | 10/2002 | Klein et al. | |

OTHER PUBLICATIONS

Neutron Detectors; The Department of PET and Nuclear Medicine at Royal Price Alfred Hosptial; May 2001; 5 pp; cs/nsw.gov.au/rpa/pet/RadTraining/NeutronDetectors.htm.
Focal plane detection setting; 10 pp; ganll.fr/vamos/detector.html.
Neutron Detectors; 2001; 3 pp; sciner.com/Neutron/neutron_detectors.htm.
Bock, Rudolf K.; Drift Chamber; Apr. 9, 1998; 2 pp; rkb.home.cern.ch/rkb/PH14pp/node 50.html.

(Continued)

Primary Examiner—David Porta
Assistant Examiner—Marcus Taningco
(74) Attorney, Agent, or Firm—RatnerPrestia

(57) ABSTRACT

A neutron imaging apparatus for obtaining an image of the general shape of a neutron emitting source and a bearing of the source relative to the apparatus, the apparatus comprising a chamber comprising a gas with a high probability of interacting with low energy neutrons, releasing collision products that maintain the neutron momentum, and generating ionization particles. The chamber comprises an electrode for providing an electronic signal indicative of the impact location of ionization particles on the electrode and a field to drift the ionization particles to the electrode. A readout indicates the location and time of impact of each ionization particle on the electrode; a memory stores a plurality of the electronic signals; and a computer receives and analyzes the signals and impact times and indicates the location of the source of neutrons by using back projection algorithms to calculate three-dimensional vectors indicative of the neutron path directions.

13 Claims, 6 Drawing Sheets

OTHER PUBLICATIONS

High Precision Position Sensitive Thermal Neutron Detectors at Brookhaven National Laboratory, Upton, NY; Jan. 2001; 12 pp.

The electron avalanche in the detector, The Noble Prize In Physics 1992; 3 pp; Jun. 18, 2001; nobel.se/physics/educational/poster/1992/electron.html.

Schulte, Robert L.; Kesselman, Martin; Swanson, Frank R.; Abstract: Development of a Directional Thermal Neutron Detector System, Northrop Grumman Corp., Bethpage, NY; 2 pp; Jul. 1996; stormingmedia.us/96/9614/A961413.html.

Goldhaber, Judith; LBL EOS time projection chamber, Feb. 28, 1992; 2 pp; lbl.gov/Science-Articles/Archive/eos-time-projection-cahmber.html.

Bock, Rudolf K.; Field Shaping; Apr. 9, 1998; 1 p; rkb.home.cern.ch/rkb/PH14pp/node 70.html.

Bock, Rudolf K.; Gas Mixtures in Gaseous Detectors; Apr. 9, 1998; 2 pp; rkb.home.cern.ch/rkb/PH14pp/node76.html.

Snowden-IFFT, D.P.; Ohnuki, T.; Rykoff, E.S.; Martoff, C.J.; Neutron recoils in the DRIFT detector; Nuclear Instruments & Methods in Physics Research; 2002; 10 pp; Elsevier Science B.V.

Van Vuure, T.L.; Bos, A.J.J.; Van Eijk, C.W.E.; Farahmand, M.; Fetal, S.T.G.; Fraga, F.A.F.; Hollander, R.W.; Kreuger, R.; Margato, L.M.S.; Schippers, J.M.; GEM application in neutron detection, dosimetry and proton therapy; Poster 09; Jun. 29, 2001; pp. 72-73.

Van Vuutre, T.L.; Van Eijk, C.W.E.; Fraga, F.; Hollander, R.W.; Kreuger, R.; Margato, L.; GEM neutron detector development; Session 3; Jun. 29, 2001; pp. 41-42.

Bachmann, S.; Bressan, A.; Kappler, S.; Ketzer, B.; Deutel, M.; Ropelewski, L.; Sauli, F.; Schulte, E.; Development and Applications of the Gas Electron Multiplier; European Organization for Nuclear Research; Imaging 2000 Conference; Stockholm, Sweden; Jun. 28-Jul. 1, 2000, 5 pp.

Bachmann, S.; Bressan, A.; Ropelewski, L; Sauli, F.; Sharma, A.; Mörmann, D.; Charge Amplification and Transfer Processes in the Gas Electron Multiplier; European Laboratory for Particle Physics; Nuclear Instruments and Methods In Physics Research; Apr. 12, 1999, 4 pp.

Kubo, Hidetoshi; Miuchi, Kentaro; Nagayoshi, Tsutomu; Ochi, Atsuhiko; Orito, Reiko; Takada, Atsushi; Tanimori, Toru; Ueno, Masaru; Development of a time projection chamber with micro pixel electrodes; Elsevier Science; 2001; 4 pp.

Yu B. et al., "A Position Sensitive Ionization Chamber for Thermal Neutrons", Nuclear Science Symposium Conference Record, Oct. 15, 2000, pp. 5-163-5-166, vol. 1, Brookhaven National Laboratory, Upton, New York, USA.

* cited by examiner

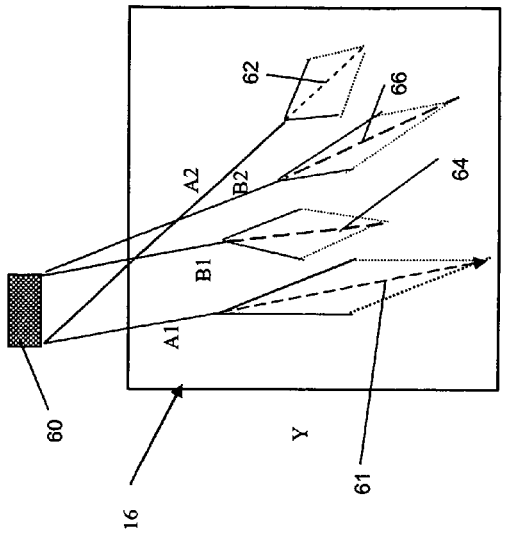
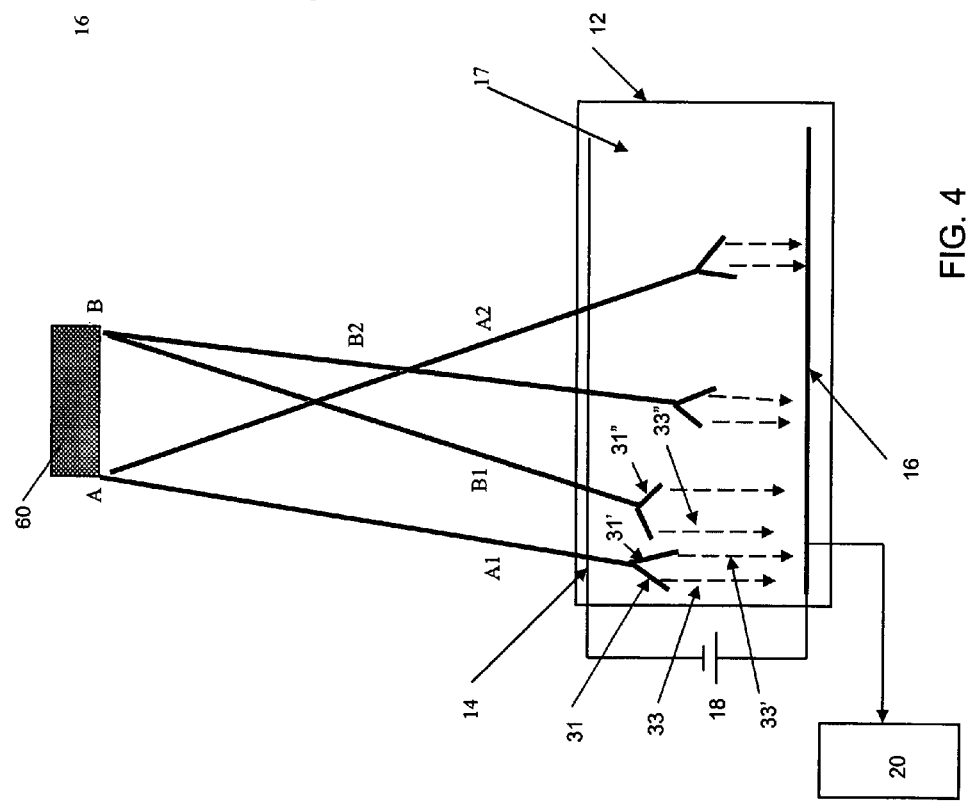
FIG. 4a
FIG. 4b
$A1=f_1(x,y,t)$
$B1=f_2(x,y,t)$
$A2=f_3(x,y,t)$
$B2=f_4(x,y,t)$
....
$Ai=f_i(x,y,t)$
$Bi=f_i(x,y,t)$
FIG. 4

NEUTRON SOURCE DETECTION CAMERA

This application is a divisional application of application Ser. No. 10/899,411, filed Jul. 26, 2004 now U.S. Pat. No. 7,049,603.

FIELD OF THE INVENTION

This invention relates to a method and associated apparatus for remotely locating a radiation source emitting neutrons by identifying the presence and travel path of neutrons arriving at a detection point.

BACKGROUND OF THE INVENTION

Transmission x-ray imaging is widely used for the detection of prohibited items within air and sea cargo containers, vehicles and railcars. However, while x-rays are extremely useful in identifying certain hidden objects, they are not very useful in identifying a wide variety of other potentially extremely dangerous items such as drugs, explosives and special nuclear materials (SNM).

Transmission x-ray images become even less practical to use in open environments such as warehouses or the hold of cargo ships, etc. Furthermore, considering that a particular prohibited material may be in a magnetic steel container as are commonly used in the shipping industry, the use of alternative techniques involving electromagnetic fields or radiation with the possible exception of hard x-ray or gamma radiation is practically precluded.

An additional problem in detecting such prohibited materials arises out of the total lack of knowledge as to whether such materials are indeed present in a particular shipment which may well involve a plurality of shipping containers or other packages stored or arriving in storage area, a warehouse or present on the deck or cargo hold of a ship.

Some fissile materials emit copious amounts of gamma rays from their predominant radioactive alpha decays, which are easily detected in gram quantities of material in seconds if the material is close and unshielded. However, the energy of the intrinsic gamma rays for fissile material is rather low and easily absorbed. Therefore, with even modest amounts of shielding, the gamma-ray signatures of even kilograms of fissile material disappear into the background, rendering their detection through characteristic gamma rays difficult if not impossible in limited amounts of time.

All fissile material has a finite probability of undergoing spontaneous fission instead of alpha-decaying, thereby emitting neutrons that can be detected. Thus, the type of prohibited materials of most interest are themselves generally neutron emitters and also have very specific neutronic properties, making neutron detection and imaging an ideal method for detecting and identifying such materials. Neutrons are much more difficult to absorb and therefore shielding such prohibited material becomes more difficult, Therefore, neutron detection offers a better opportunity to detect shielded fissile material.

Additionally many non-neutron emitting materials can be identified by their specific responses to irradiation with neutron radiation. U.S. Pat. No. 5,838,759 issued Nov. 17, 1998 to R. A. Armistead, discusses the possibility of using such a neutron method for cargo containers but concludes that such systems are impractical.

U.S. Pat. No. 5,278,418 issued Jan. 11 1994 discloses a method for detecting a predetermined amount of oxygen and nitrogen in a luggage type container. The disclosed system is confined to detection of suspect materials in small containers whose locality is well known, such as a luggage conveyor belt. The disclosed method would be practically impossible to implement in an open environment as that of a warehouse containing a plurality of shipping containers.

In Jan. 2001, Brookhaven National Laboratory disclosed a high precision, high efficiency thermal neutron detector using multiwire proportional chambers filled with $^3$He. Neutrons enter the detector chamber through an aluminum window and collide with the $^3$He generating protons and tritons which produce ionization electrons that drift through an upper wire cathode producing an avalanche on the nearest anode wire or wires.

The upper cathode and anode wires run in the same direction. There is also a lower cathode formed of metal strips running at right angles to the anode wires. The avalanche induces positive charge on both the upper and lower cathodes. The sampling of induced charge with cathode wires or strips yields the center of gravity of the anode avalanche with high precision, providing a two dimensional position indication of the collision locus of the neutron with the $^3$He.

While all of the above systems will detect the presence of neutron radiation when placed in the vicinity of a neutron radiation source, none will provide information regarding the direction of the source relative to the detector or an image of the source distribution and location as observed from the position of the detector.

There is therefore still a need for a neutron radiation detector imaging system that, when placed in the general vicinity of a source or a plurality of sources of neutron radiation, will provide an image of the location and or distribution of such source or sources, thereby permitting easy identification of a suspect container with a reasonably high degree of certainty.

SUMMARY OF THE INVENTION

In accordance with the present invention, there is provided a detector apparatus and associated method for obtaining an image of a neutron emitting source or sources indicating the source general shape, location and distribution relative to the detector. The detector and associated method determine the direction of the path of individual neutrons emitted by the source and using this information to reconstruct an image and location of the source by back projecting such paths to their points of origin.

Specific neutron reactions with certain gases convert the neutron momentum wholly into momentum of charged particles, which can be directly measured. Reconstruction of the neutrons' paths is based on the determination of the neutron momentum. The neutron momentum is reconstructed by determining the three dimensional trajectories of collision byproducts between the neutron and a gas atom nucleus in a gas chamber. The three dimensional trajectories are obtained using a time projection chamber detector.

In its simplest form, the invention provides a neutron imaging apparatus or neutron camera for detecting a spatial three dimensional path of a neutron emitted from a neutron source. The camera comprises:

I. A chamber containing a gas selected, inter alia, to provide a high probability of interacting with low energy neutrons, such as Helium-3, Boron trifluoride, Boron trichloride, etc. and to release ionization electrons along the paths of products of such interaction.

II. An electrode in the chamber, designed to provide an electronic signal indicative of the geometric impact location of ionization products on the electrode.

III. An electric field designed to drift the ionization produced by charged particles to the electrode.

IV. A means to read out the electronic signal from the electrode indicating the location of the impact of the ionization and a time of impact of the ionization on the electrode.

V. A memory for storing the readout electronic signals representing the location and time of impact of a plurality of charged particles.

VI. A computer programmed to:

(a) analyze a plurality of electronic signals and impact times of a plurality of charged particles on the electrode and to provide for each suitable combination of signals a three dimensional vector indicative of the neutron path direction in three dimensional space; and (b) indicate the location relative to the camera position and, optionally, to reconstruct an image of the neutron source using back projection algorithms which extend the neutron tracks to their point of origin.

Associated with the apparatus, and still according to this invention is also a method for identifying and locating a source of neutron radiation.

This method comprises the step of determining the three dimensional trajectory of a neutron emitted by a source relative to a reference frame by deriving a momentum vector for the neutron in said reference frame. Such determination is done by permitting the neutron to collide with a $^3$He or $^{10}$B nucleus, reacting therewith so as to transform its momentum into charged collision products (e.g. $n+^3He \rightarrow ^3H+p$ or $n+^{10}B \rightarrow ^4He+^7Li$) The collision products' momenta are determined by causing ionization particles from an ionization trail generated in the gas by the collision products to drift in an electric field and impact on a collecting electrode designed to provide an electronic signal indicative of the geometric impact location of the ionization onto the electrode. This signal together with a signal containing information representing the impact time are collected and stored continuously during a measurement period. Each of a plurality of such signals from a plurality of neutron interactions producing ionization is used to reconstruct a momentum vector for each of a plurality of neutrons, thereby providing a three dimensional vector of the path of each neutron. A plurality of such three dimensional neutron paths from a plurality of neutrons is then used to determine the location of the source of such neutrons through backprojection, and if desired to reconstruct an image of the source using backprojection algorithms.

BRIEF DESCRIPTION OF THE DRAWINGS

FIG. 2b is a simplified schematic representation of a plan view of an anode of the apparatus shown in FIG. 2a to illustrate the two-dimensional geometric determination of the range vectors of the reaction products generated between the collision of a neutron and a nucleus in the apparatus of FIG. 2a.

FIG. 2c is a simplified timing diagram illustrating the method used to determine the third dimension of the range vector of a collision byproduct generated in the collision of a neutron and a nucleus in the apparatus of FIG. 2a.

FIGS. 4 and 4a illustrate the way a neutron source is detected and if desired imaged according to this invention.

FIG. 4b shows the output data obtained used to reconstruct the neutron source image.

DETAILED DESCRIPTION OF THE INVENTION

The invention will next be described with reference to the figures wherein the same numerals are used to identify same elements in all figures. The figures illustrate the invention and are not intended to act as engineering or construction drawings, therefore they are not to scale and do not include all elements that may be included in such drawings, as inclusion of such elements would unduly clutter the drawings.

Figure 1:
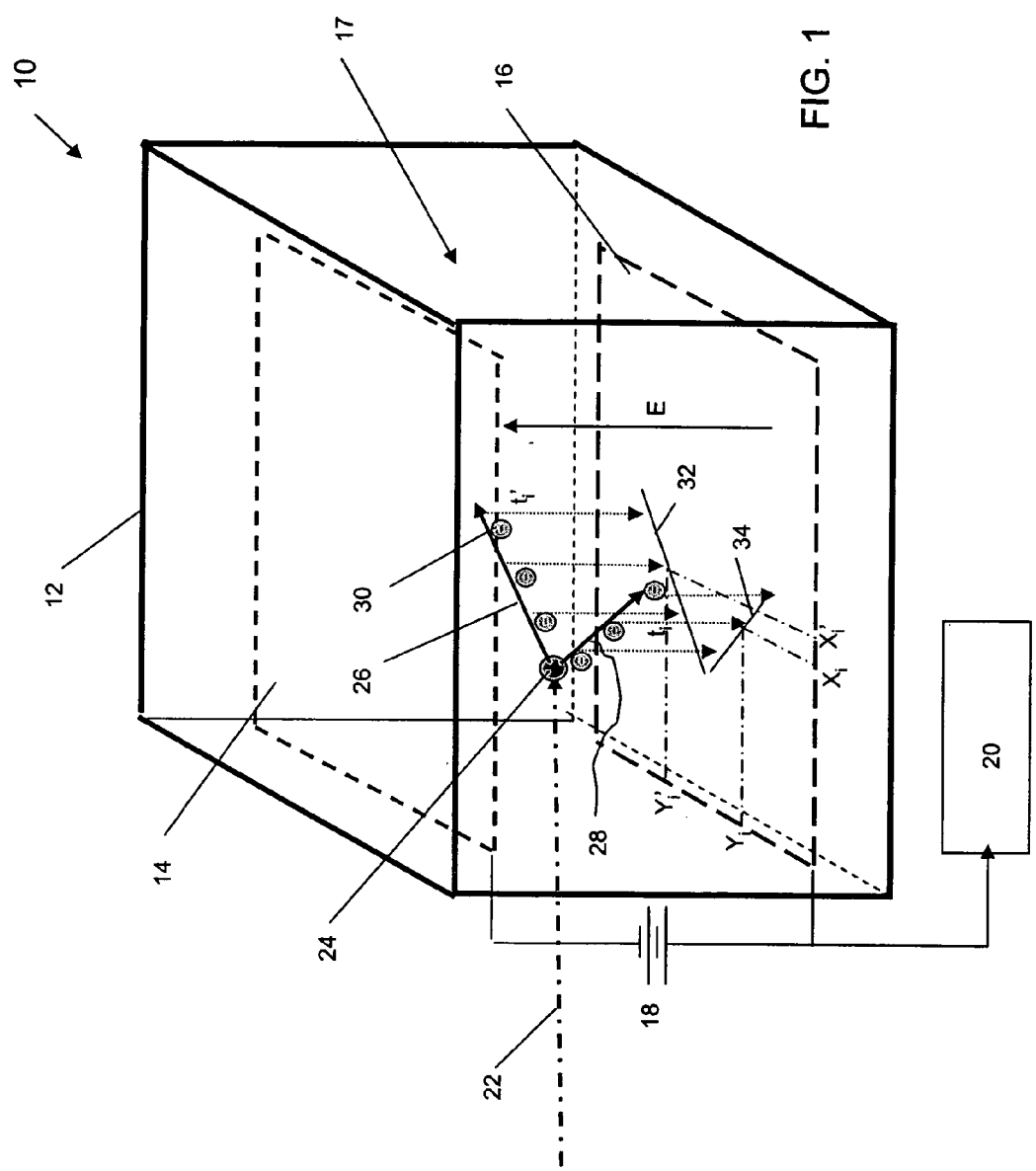
FIG. 1 illustrates the basic principle of operation of the neutron detection method according to the present invention.

Referring next to FIG. 1, there is shown an apparatus 10 comprising an enclosure 12 containing a gaseous medium 17, an anode electrode 16 and a cathode electrode 14. For the reasons discussed below, the gaseous medium may be $^3$He or $^{10}$BF$_3$ or other species suitable for the application. An electric field E is applied between the anode and cathode using a voltage source 18.

Also shown in FIG. 1 is a neutron traveling along path 22. Neutrons are hard to detect because they do not leave a trail of ionized atoms behind as charged particle radiations do. They rarely interact at all with most forms of matter. In the case of the present invention it is necessary to detect not only the presence of a neutron but also to measure its path in three dimensional space. This is done, in accordance with this invention by colliding the neutron with certain nuclei which interact relatively strongly with neutrons, and which do so in a way that transforms the full (or substantially the full) neutron momentum into charged particles as reaction products. By subsequently detecting the ionization paths left by the charged particle collision products the original momentum vector of the neutron is reconstructed. This provides the direction of the neutron path from the source to the point of collision. By detecting a plurality of such events, thus generating directional data for a plurality of neutrons emanating from a source, the location and source shape may be reconstructed using backprojection techniques.

In order to measure the momentum of the collision products in accordance with this invention, such products must be charged particles which are themselves directly detectable through their ionization of the gaseous medium, and whose total momentum following the reaction of the neutron with the active species in the gas (for example $^{10}$B in BF$_3$) is substantially the same as the momentum of the neutron. There are few nuclei which convert neutron momenta completely into charged particle momentum. Two of these are most suitable for high efficiency image detection: Helium-3 ($^3$He) and Boron-10 ($^{10}$B) which is usually obtained in gaseous form as Boron tri-Fluoride. The charged particle collision products are $p+^3H$ for reaction with $^3$He and $^4He+^7Li$ for reaction with $^{10}$B.

When the gas contained in the enclosure is one of the two gasses discussed above the momentum of the neutron colliding with an atom of the gas is transferred to the proton and tritium when $^3$He gas is used in the enclosure, or to the $^4$He and $^7$Li when using Boron trifluoride gas as the Boron source.

Returning to FIG. 1 a neutron traveling along path 22 is shown colliding with the nucleus 24 of an $^3$He atom within the enclosure 12. The collision products, a tritium and a proton must share the momentum of the neutron. They subsequently travel along paths 26 and 28. Depending on the gas pressure and neutron energy the collision products will travel a certain distance (the "range") within the chamber, approximately proportional to the energy imparted to them as a result of the collision. For neutrons in the fission energy region, the range-momentum relationships for the produced charged particles are well known and tabulated, and the ranges are of the order of a few millimeters to a few centimeters. Thus the tracks can be suitably contained and the momenta of each particle fully measured. Additional information is obtained by measuring the ionization density and total ionization along the charged particles' tracks. Using additional well known and tabulated data for charged particles, these ionization measurements permit the individual charged species to be identified (i.e. Distinguish p from $^3$H from $^4$He etc.) and allow checks to be made for non-contained tracks or other errors, as well as refining the measurement of the momenta. Data on ranges and ionization density are tabulated in e.g. "*The Stopping and Range of Ions in Solids*", by J. F. Ziegler, J. P. Biersack and U. Littmark, Pergamon Press, New York, 1985 (new edition in late 1996) and software available from http://www.srim.org.)

The collision products generate a plurality of ionized gas molecules (freed electrons and residual positive ions) along their paths. The negatively and positively charged ionization products drift toward the anode cathode electrodes respectively, under the influence of an applied electric field E generated by the voltage source 18.

FIG. 1 illustrates only negatively charged particles, i.e. electrons and negative ions. It is understood, however that positive ions are also generated and such ions drift toward the cathode, where they can be detected, although such ions are not shown in the figure so as not to unduly clutter the figures. In addition, because negative ions have a higher potential for signal amplification by Townsend avalanche than positive ions and therefore their detection tends to generate a stronger signal, the detection of negative ions is preferred. However, detection of positive ions in addition to negatives is desirable because it gives information about the absolute position along the drift direction at which the interaction occurred.

The negative ionization products drift in the space between the anode and cathode generally along the electric field lines and eventually impact on the anode 16. Anode 16 is structured such as to provide signals indicative of the two dimensional distribution of the impact points Xi, Yi of the ionization products. Thus, as shown in FIG. 1 the anode provides geometrical data showing 32 and 34, the two dimensional projections onto the anode of the charged particle reaction products' actual paths 26 and 28

Figure 2A:
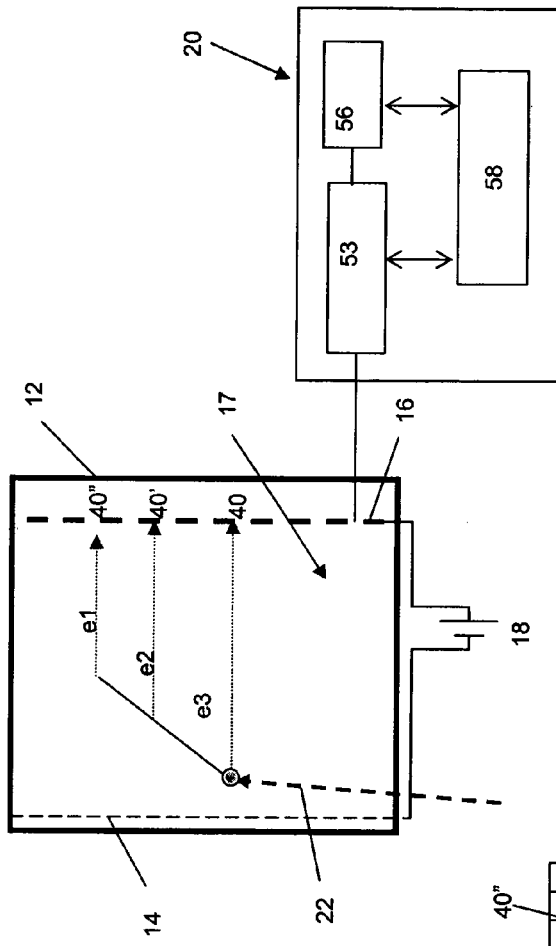
FIG. 2a is a simplified elevation view of the apparatus of FIG. 1 showing the partial effect of a neutron collision with a nucleus of a gas in the apparatus of FIG. 1.

Turning next to FIGS. 2a and 2b there is again shown in schematic elevation the chamber 12 and the path of only one of the two charged particle reaction products shown in FIG. 1. The ionization products e1, e2 and e3 drift and impact on the anode 16 at points 40, 40' and 40" which are read out through electronics 53 and stored in a memory 56 as a set of co-ordinates $X_1Y_5$, $X_3Y_4$, $X_5Y_3$ (The number of measured points is in reality much greater, but three points are selected only for purposes of explanation of the system operation, and are not to be considered as limiting in any way.)

These co-ordinates provide the two dimensional direction and magnitude of the range vector of the one charged reaction product particle. The corresponding momentum vector is in the same direction as the range, and has a magnitude determined from the tabulated range-momentum data tabulated e.g. by J. F. Ziegler et al. referred to above.

The readout electronics 53 also provide the time at which the ionization products reach the anode at each point of measurement. Thus, for each geometric co-ordinate $X_1Y_5$, $X_3Y_4$, $X_5Y_3$ etc. we have associated therewith a time $t_1$, $t_2$, $t_3$ etc. This time representing the drift time of the charged particle to reach the anode is used to measure the third dimension (Z) extent of the ionization track left by each charged reaction product. This is done using the known (from calibration), stable drift speed of ionization for the particular gas composition, pressure and electric field employed, and is stored in memory 56 together with the associated (X, Y) position information.

Figure 2C:
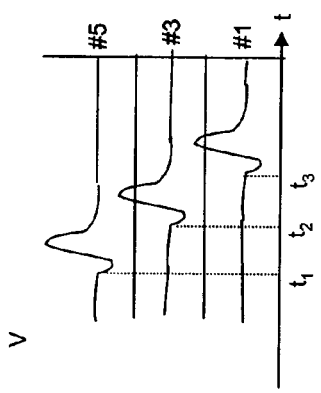
Figure 2B:
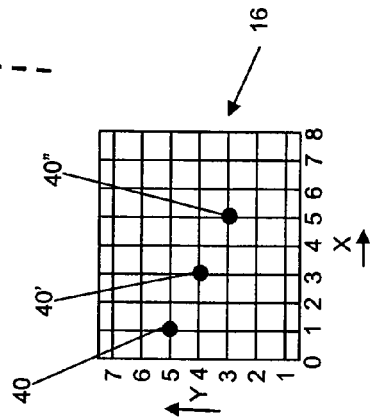

FIG. 2c shows a schematic representation of the time relationship between signals obtained by the anode along the "X" axis as ionization products impact thereon, for sample points 40, 40' and 40". As shown the ionization particles for measured point 40" arrive earliest, corresponding to the fact that point 40" is closest to the anode in elevation view 2a. The total time spread between beginning and end of a set of signals is multiplied by the well known (and stable) drift speed for the configuration employed, giving the Z-component of the length of the charged particle reaction product's range.

Combining the Z component with the X and Y data from the anode segmentation, the full three dimensional extent and direction of the collision products track is thereby measured. Combined with the ionization information discussed above, the identity and momentum of the charged particle reaction product is uniquely determined.

Figure 3:
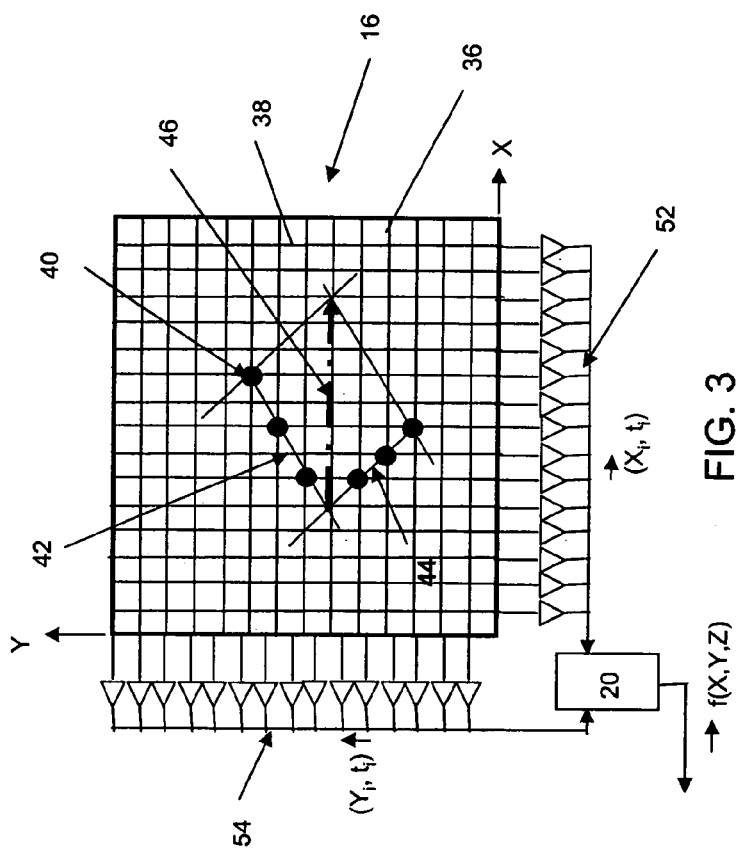
FIGS. 3 and 3a show in somewhat more detail the reconstruction of a neutron travel direction by the reconstruction of the neutron momentum vector.
Figure 3A:
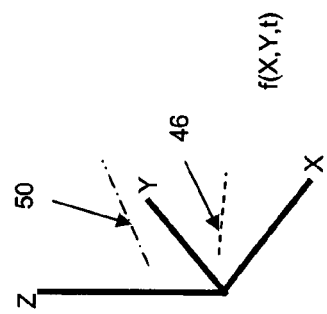

FIGS. 3 and 3a show, again in schematic representation, one possible realization of a system to perform the complete reconstruction process of a neutron path using both charged reaction product particles. As shown, anode 16 defines a plane and an associated X-Y Cartesian co-ordinate system. The anode 16 comprises a plurality of electrodes 36 and 38 arranged along the "X" and "Y" co-ordinates. A readout system of amplifier/digitizers 52 and 54 outputs ionization product impact co-ordinates as well as ionization intensity and impact time for the ionization products arriving on the anode. The two impact traces 42 and 44 represent the charged reaction products' range vectors projected on the X-Y plane (here the same plane as the anode). The relative drift time for the ions reaching the anode is dependent on the relative distances from the anode at which the ionization products were generated. Computer 20 receives and stores the output data in a memory not shown in this figure. From the impact location and impact time function f(X, Y,t) the computer is programmed to generate a function f(X,Y,Z) representing the resulting momentum vector of the sum of the momentum vectors of the two collision byproduct particles. Because of the conservation of momentum principle, this momentum vector is equal to the momentum of the neutron that produced the original nuclear collision. Thus the neutron momentum direction (and thereby the flight path) relative to a co-ordinate system referenced on the detection chamber is obtained.

For neutrons in the fission energy range the charged particles produced following a collision have relatively long range (a few mm to a few cm depending on the gas pressure in the chamber). The tracks can be contained and the momentum vectors fully measured in a suitably designed gas detector chamber at gas pressures of about one bar to several tens of bar. High gas pressures are preferred for good efficiency with a detector of reasonable volume. The only other reaction channel open at the low neutron energies of interest is elastic scattering, which is easily distinguished from the (n, p) or (n, α) reactions. Elastic scattering is not useful for high resolution imaging but is useful in confirming low rate detections.

EXAMPLE

An incident neutron with 1 MeV kinetic energy (near peak of fission spectrum) is directed along the z (drift) axis. The chamber contains $^{10}BF_3$ at 0.5 atmosphere. A collision of the neutron with $^{10}BF_3$ produces (1) a Li track 7.58 mm long and generates approximately 71,600 primary ionizations, and (2) a $^4$He track 11.38 mm long containing approximately 79,400 primary ionizations. The range energy correlation is quite sufficient to identify which fragment is the He and which is the Li. If the 71,600 ion track were He rather than Li it would have to have a range of 10.2 mm, for example. The sum of the ionizations is divided by the well known "W" parameter (W=kinetic energy per ion pair) for $BF_3$, minus the Q value of 2.79 MeV for the $^{10}B$ reaction. This determines the neutron energy to an accuracy of about 4 percent.

The kinematics of the reaction will result in the Li track being directed at approximately 38 degrees to the incident neutron direction, and the He track being directed at approximately 50.3 degrees to the incident neutron track. The two tracks define a scattering plane. Assume this plane is oriented at an angle of 30 degrees with respect to the x-measuring strips in the anode plane. Then the measured range components of the two tracks will be: Li $r_x$=4.00 mm $r_y$=2.32 mm $r_z$ =3.00 mm He $r_x$ =−7.80 mm $r_y$=−4.38 mm $r_z$ =7.28 mm. For this calculation, it is assumed that a GEM anode is used in the chamber able to measure the x and y components to about 0.1 mm. The z components are measurable to about 0.025 mm using the drift times.

In actual operation, the available information is the measured range components and the ionizations. To calculate the incident neutron direction one may proceed as follows:
Compute
1. Kinetic energies $T_{Li}$=Li ionization×$W$ for $BF_3$ $T_{He}$=He ionization×$W$ for $BF_3$ $T_n = T_{Li} + T_{He} - Q$ ($Q$ for $^{10}B$=2.79 MeV)

2. Momentum magnitudes $p_{Li}$=sqrt($2 \times m_{Li} \times T_{Li}$)

$p_{He}$=sqrt($2 \times m_{He} \times T_{He}$)

$p_n$=sqrt($2 \times m_n \times T_n$)

3. Components of neutron momentum $p_{nz} = p_{Li} \times (r_{z\ Li}/r_{total\ Li}) + p_{He} \times (r_{z\ He}/r_{total\ He})$ $p_{ny} \times p_{Li} \times (r_{y\ Li}/r_{total\ Li}) + p_{He} \times (r_{y\ He}/r_{total\ He})$ $p_{nx} = p_{Li} \times (r_{x\ Li}/r_{total\ Li}) + p_{He} \times (r_{x\ He}/r_{total\ He})$ Where $p_{nx}$, $p_{ny}$ and $p_{nz}$ are the vector components of the neutron momentum, which indicate its geometrical direction of travel relative to the chamber co-ordinate system. These vectors are next used for the backprojection reconstruction of the neuron path.

The above example provides a simplified explanation in terms of sequence of steps. Alternatively, mathematical algorithms well known in the art such as "constrained fitting" may be used to simultaneously take into account all the measured values; such algorithms yield somewhat more accurate results. Also relativistic kinematics may be used rather than the non-relativistic kinematics shown here; however this will only produce a nearly negligible improvement in accuracy.

A potential problem in reconstructing the path of a neutron using the impact of drifting particles onto a collecting electrode is diffusion of the particles as they drift toward the anode thereby "blurring" the path projection onto the anode. Detectors with a drift distance smaller than approximately 20 cm do not appear to suffer significantly from this problem. However for chambers with greater drift distances, and for increased resolution in smaller chambers, the use of certain additives in the gaseous mixture in the chamber is preferred. Such additives are selected to minimize the effects of diffusion during the drift time to the anode, by converting the ionization electrons produced by the charged reaction product particles, into negative ions. The ions drift with much lower diffusion than the original ionization electrons would, preserving the directional information of the tracks.

Suitable additives include but are not limited to carbon disulfide vapor, biacetyl vapor, and chlorinated hydrocarbons. The total pressure of the gas filling is selected in the range 0.1–100 bar to maximize detection efficiency and obtain reasonable safety in operation. The partial pressure of the additive is adjusted in the range 0.02–0.2 bar to obtain satisfactory additive performance and minimize background.

In suitable mixtures, the use of these additives reduces diffusion (blurring) of the track components both parallel and transverse to the track drift direction to their thermodynamic lower limits, even at the highest drift fields (>1 kV/cm) where this limit is smallest.

Identification of the location of a source 60 of neutron radiation relative to the detection chamber is illustrated in FIGS. 4 and 4a. Neutrons from a point "A" on the source 60 travel along various paths A1, A2, etc. to the detecting device chamber 12. Once in the chamber a number of the neutrons collide with the nuclei of one of the gasses discussed above, for example $^3$He, contained within the chamber, transforming their momentum into charged reaction products traveling along paths 31, 31', 31", etc. These charged particles in turn generate ionization products (electrons or negative ions) that drift under the influence of the applied electric field to the anode 16. As shown in FIG. 4a determination of the momentum vectors 61 and 62 of charged reaction product momenta gives us the momentum vector and hence the flight direction A1 and A2 of the neutron from the source to the chamber. For a plurality of neutrons, these directions are back-projected to their closest point, identifying the location and distance relative to the chamber of the site of origin of the neutrons. In a perfect world with a point source of neutron radiation, the paths will intercept providing an exact source location. In the real world the paths may or may not intercept, however the closest point is usually sufficient to permit locating a source of neutron radiation.

While a minimum of two such paths may determine a point of origin, and therefore the location of a source, in practice a plurality of such intersecting paths will be used to provide better accuracy of this location or a map of extended or multiple sources which may be present.

Similarly, neutrons originating from point B on the source and traveling along paths B1, B2 etc. will provide momentum vector data that when back-projected will disclose point "B" on the source of neutron radiation. FIG. 4b shows the data obtained and stored by computer 20. It is obvious that an image of the source can therefore be obtained by summing all points of origin between "A" and "B", providing not only the distance and bearing of the source relative to the chamber 12 but an image of the source as well.

Figure 5:
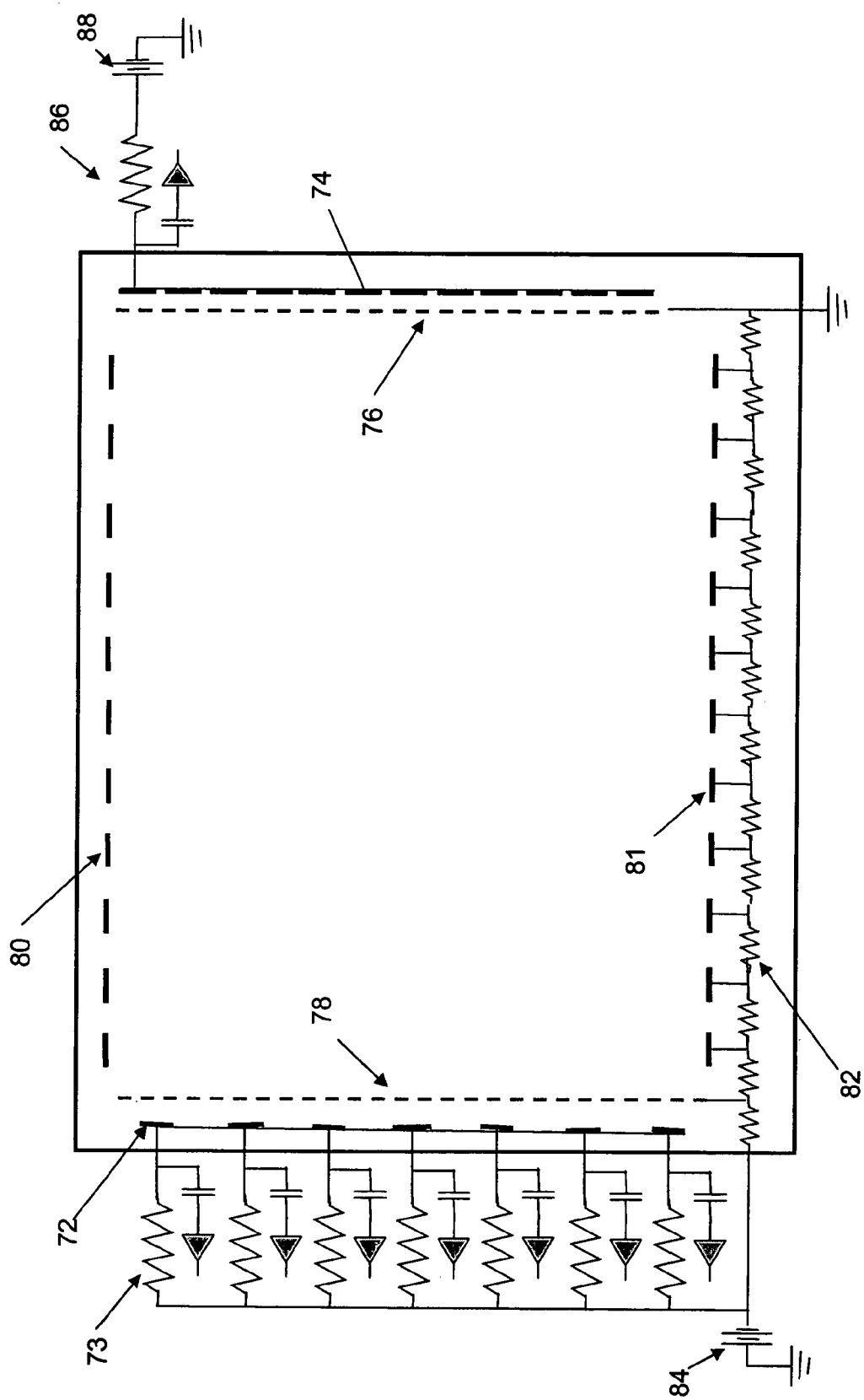
FIG. 5 shows in schematic representation a preferred embodiment of an apparatus in accordance with the present invention.
Figure 6:
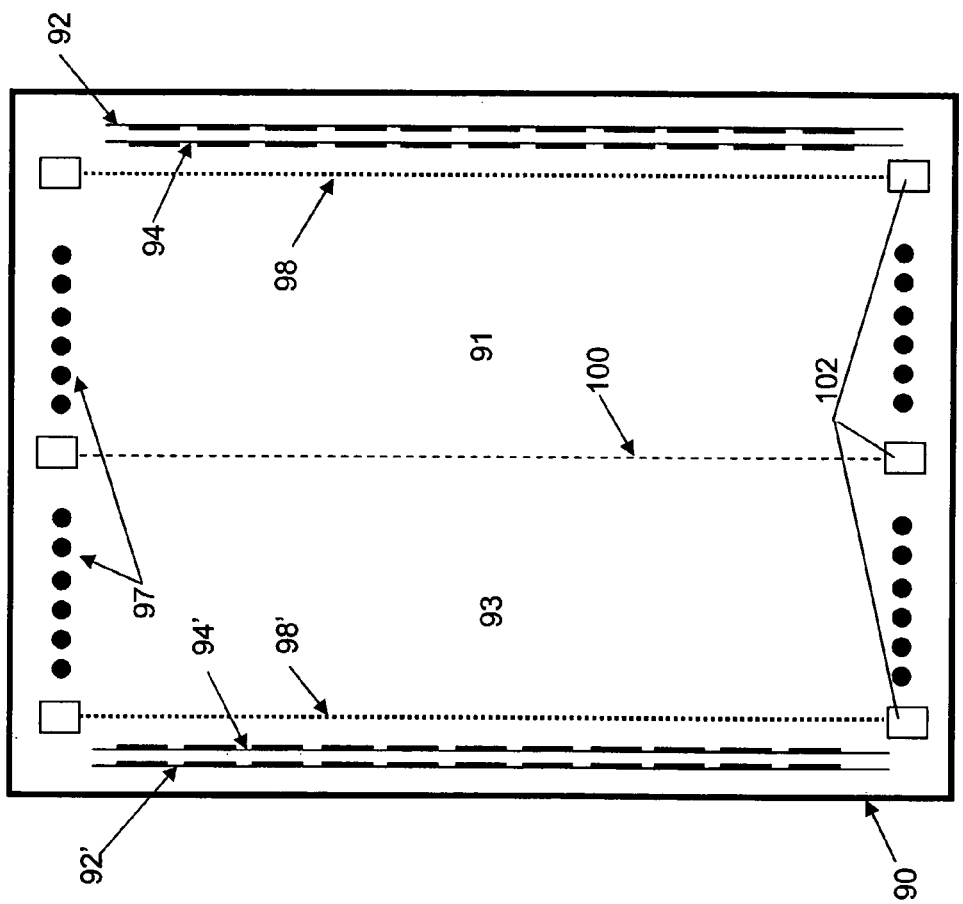
FIG. 6 shows in schematic representation yet another embodiment of an apparatus in accordance with the present invention.

FIG. 5 illustrates an alternate embodiment of a detection chamber 70 suitable for use in this invention. The chamber comprises an enclosure 64 containing a gas which is one of the aforementioned $^3$He or $^{10}$B (in gaseous form, such as Boron tri-Fluoride) as well as one of the suitable additive gasses also discussed above, selected to generate negative ions. Not illustrated are means to input and pressurize the gasses in the chamber as such means are well known in the art and not of importance to this invention, as long as they permit filling the chamber and maintaining a desired pressure.

Within the enclosure 64 is placed a drift cathode electrode 72 and an anode electrode 74. A high voltage source 84 applies a drift cathode "high" voltage V1 to the drift cathode 72. An anode gain voltage V2 is applied to the anode 74 through a voltage source 88. Preferably the anode electrode 76 is a GEM anode. GEM anodes are well known in the art and described in, inter alia, U.S. Pat. No. 6,011,265 issued to F. Sauli on Jan. 4, 2000, and in an article entitled "Development and applications of the gas electron multiplier by S. Bachmann et al. first presented at the Imaging 2000 conference in Stockholm, Sweden, Jun. 28–Jul. 1, 2000. The contents of both the above references are incorporated herein by reference.

A first Frisch grid 76 is, preferably, positioned ahead of the anode 74 and similarly, if desired, a second Frisch grid 78 may be placed ahead of the cathode 72.

Electronic readout circuitry 86 and 73 is provided to permit reading out electrical signals from the impacting ionization products on the anode (negatives) 74 and cathode (positives) 72 respectively. These signals are used to identify the x-y coordinates of the ion impact position on the anode and cathode. The read out electronics also preserve the corresponding impact time of the ions thereby providing a signal indicative of the relative distance of the drift starting point for the impacting ions and therefore permitting a calculation of this point in a third (z) dimension. The time difference between signals arriving at the anode and the cathode, combined with the calibrated and stable drift speeds of positive and negative ions in the gas mixture used, provide an absolute measure of the z position of origin of the ionization being measured.

Preferably, as shown in FIG. 4 there are also included in the chamber a plurality of field shaping electrodes 80 and 81 held at graded potentials by a voltage divider circuit 82. This method of providing a homogeneous field within the drift volume is well known in the art.

An alternate embodiment of this invention is illustrated in FIG. 7. As shown in this figure there is again a gas containing enclosure forming a chamber 90, containing a gas mixture as disclosed above in connection with FIG. 4. As before the input and output conduits and valves for injecting gas into the chamber and an associated system that includes as minimum a pressure sensor, a pump, and either a flow controller on the gas supply or a conductance controller on the pump for maintaining a constant gas pressured are not shown to avoid undue cluttering of the illustration. Such systems and different variations thereof are well known in the art. Within the chamber there is again placed an anode electrode, preferably a GEM anode. Shown in more detail in this figure is the GEM anode readout electrode 94 and the GEM anode gain plane 93 including readout field shaping electrodes 97. A mesh electrode 98 which may be a Frisch electrode is used in front of the anode.

As shown in this figure, the chamber is divided into two mirror image sections 91 and 93, separated by a mesh electrode 100 maintained at a high negative voltage and serving as the cathode, supported by insulators 102.

In section 93 there are positioned again, typically but not essentially in a mirror arrangement with the elements of section 91, a second anode electrode 92' which again may be a GEM anode, together with readout field shaping electrodes 97 and the GEM anode gain plane 94'. A Frisch type grid 98' may again be used in front of the second anode 92'. Preferably drift field shaping electrodes 104 may be used, extending in both sections of the chamber.

While single plane anode electrodes have been used in the illustrations to show an anode, more complex structures are preferred. To translate good time resolution into spatial resolution, it is important to have predictable ion drift velocity, and a simple relation for tracks passing under different angles. This requires special care in the shape and constancy of the applied electric fields in the drift volume.

In one embodiment, in planar drift chambers, the anode wires may, preferably, alternated with field shaping cathode wires usually referred to as "field" wires. These wires serve to reinforce the electric field between two anode wires. In another, preferred embodiment GEM anodes including and occasionally multiple GEM anodes, may be used for improved detection efficiencies. Furthermore, neutron detection structures such as disclosed by the Brookhaven National laboratory employing an upper wire cathode a wire anode and a lower cathode formed with conductive strips running at right angles to the anode wires may be used to detect the original neutron impact centroid.

While this invention has been illustrated using planar electrodes for the cathodes and anodes, the present invention is not to be restricted to using only planar electrodes and rectangular drift chambers. Cylindrical and spherical configurations as well as compound shapes may also be used for the drift volume design, including corresponding electrode configurations, and remain within the scope of this invention.

Finally, although the embodiments of the invention described above have been in terms of specific embodiments, it is contemplated that similar concepts may be practiced with other three dimensional neutron path detection devices. Also, it may be understood by one skilled in the art that a number of other modifications exist (such as the aforementioned constructions in cylindrical rather than planar geometries) which do not deviate from the scope of the present invention as defined by the appended claims.

What is claimed is:

1. An neutron imaging apparatus for obtaining an image of a general shape of a neutron emitting source and a bearing of said source relative to the neutron imaging apparatus, the neutrons having a momentum, the apparatus comprising:

I. A chamber containing a gas, said gas having:
   (a) a high probability of interacting with low energy neutrons, and
   (b) releasing collision products that maintain said neutron momentum, and generate ionization particles in said gas;

II. a first electrode in the chamber, designed to provide an electronic signal indicative of the geometric impact location of ionization particles on the electrode;

III. an electric field in said chamber designed to drift the ionization particles to the first electrode;

IV. a means to read out the electronic signal from the first electrode indicating the location of the impact of the ionization and a time of impact of the ionization on the first electrode;

V. a memory for storing a plurality of readout electronic signals representing the location and time of impact of a plurality of charged particles; and VI. a computer adapted to receive said plurality of electronic signals and programmed:

(a) to analyze said plurality of electronic signals and impact times of a plurality of charged particles on the first electrode and to provide three dimensional vectors indicative of the neutron path directions in three dimensional space; and (b) to indicate the location of said source of neutrons relative to the imaging apparatus position by applying back projection algorithms which extend the neutron tracks to their point of origin.

2. The apparatus according to claim 1 wherein said computer is also programmed to reconstruct an image of the neutron source using back projection algorithms which extend the neutron tracks to their point of origin.

3. The apparatus according to claim 1 wherein said gas selected to provide a high probability of interacting with low energy neutrons and to release collision products that maintain said neutron momentum, comprises $^{3}$He or a gaseous compound of $^{10}$B.

4. The apparatus according to claim 3 wherein said gaseous compound of $^{10}$B is boron trifluoride or boron trichloride.

5. The apparatus according to claim 4 wherein said chamber further contains an additive selected to reduce the diffusion of ionization generated by said collision products.

6. The apparatus according to claim 5 wherein said additive comprises carbon disulfide vapor, Biacetyl vapor, chlorinated hydrocarbons or mixtures thereof.

7. The apparatus according to claim 3 further comprising a grid electrode substantially parallel to and positioned ahead of said first electrode relative to a path of said ionization particles drifting toward said first electrode.

8. The apparatus according to claim 3 wherein said first electrode comprises a GEM electrode.

9. The apparatus according to claim 3 further comprising a second electrode opposite said first electrode and spaced there from forming a first drift space between said first electrode and a first side of said second electrode, and a voltage source connected to said first and second electrodes.

10. The apparatus according to claim 9 wherein said first and said second electrodes are an anode and a cathode respectively.

11. The apparatus according to claim 10 wherein said second electrode is also designed to provide an electronic signal indicative of the geometric impact location of ionization particles thereon.

12. The apparatus according to claim 8 further comprising a third electrode opposite a second side of said second electrode and spaced there from forming a second drift space, and wherein said third electrode is also designed to provide an electronic signal indicative of the geometric impact location of ionization particles thereon.

13. The apparatus according to claim 12 wherein at least one of said three electrodes is a GEM electrode.

* * * * *